(12) United States Patent
Xie et al.

(10) Patent No.: US 12,361,007 B2
(45) Date of Patent: Jul. 15, 2025

(54) APPARATUS, METHOD AND STORAGE MEDIUM FOR DATABASE QUERY

(71) Applicant: ZILLIZ INC., San Francisco, CA (US)

(72) Inventors: Chao Xie, San Francisco, CA (US); Chao Gao, Shanghai (CN); Qianya Cheng, Shanghai (CN); Xiaomeng Yi, Shanghai (CN)

(73) Assignee: ZILLIZ INC.

( * ) Notice: Subject to any disclaimer, the term of this patent is extended or adjusted under 35 U.S.C. 154(b) by 156 days.

(21) Appl. No.: 18/062,408

(22) Filed: Dec. 6, 2022

(65) Prior Publication Data

US 2024/0184784 A1     Jun. 6, 2024

(51) Int. Cl.
| | |
|---|---|
| *G06F 16/2455* | (2019.01) |
| *G06F 16/248* | (2019.01) |
| *G06F 16/27* | (2019.01) |
| *G06F 16/28* | (2019.01) |

(52) U.S. Cl.
CPC ...... *G06F 16/24556* (2019.01); *G06F 16/248* (2019.01); *G06F 16/27* (2019.01); *G06F 16/285* (2019.01)

(58) Field of Classification Search
CPC ............. G06F 16/24556; G06F 16/285; G06F 16/248; G06F 16/27
See application file for complete search history.

(56) References Cited

U.S. PATENT DOCUMENTS

| | | | |
|---|---|---|---|
| 11,042,538 B2 * | 6/2021 | Braundmeier | G06F 16/2455 |
| 11,360,982 B1 * | 6/2022 | Liu | G06F 16/2433 |
| 2007/0276802 A1 | 11/2007 | Piedmonte | |
| 2017/0091269 A1 | 3/2017 | Zhu et al. | |
| 2017/0213257 A1 | 7/2017 | Murugesan et al. | |
| 2019/0026336 A1 | 1/2019 | Tian | |

(Continued)

FOREIGN PATENT DOCUMENTS

| | | |
|---|---|---|
| CN | 112905595 A | 6/2021 |
| CN | 113449132 B | 2/2022 |

(Continued)

OTHER PUBLICATIONS

United States Patent and Trademark Office, Office Action in related U.S. Appl. No. 18/054,323, filed Mar. 1, 2024.

(Continued)

*Primary Examiner* — Jay A Morrison
(74) *Attorney, Agent, or Firm* — Kim IP Law Group LLC

(57) ABSTRACT

The present disclosure relates to the field of computers, and provides an apparatus, a method, and a storage medium for database query, which are applied to a vector database, by acquiring a query request from a user, determining query parameters corresponding to each of multiple shards based on the query request using a preset neural network model, wherein the query parameters control query complexity by affecting a query range of database data of the query request for the corresponding shard; querying database data in each shard based on the query request and the query parameters to obtain a target query result. Accordingly, corresponding query parameters are adjusted for each shard, so that redundant queries are effectively avoided, and database performance is effectively improved.

18 Claims, 6 Drawing Sheets

(56) References Cited

U.S. PATENT DOCUMENTS

| | | | |
|---|---|---|---|
| 2020/0065412 A1* | 2/2020 | Braundmeier | G06N 3/048 |
| 2021/0035020 A1 | 2/2021 | Boulineau et al. | |
| 2022/0036123 A1 | 2/2022 | Cummings et al. | |
| 2023/0409889 A1 | 12/2023 | Haykal et al. | |

FOREIGN PATENT DOCUMENTS

| | | |
|---|---|---|
| CN | 114329094 A | 4/2022 |
| WO | 2022177150 A1 | 8/2022 |

OTHER PUBLICATIONS

Conglong Li, Improving Approximate Nearest Neighbor Search through Learned Adaptive Early Termination, Research 29: Data Mining and Similarity Search, Jun. 14-19, 2020, p. 2539-2554, Portland, OR.

Marcus et al. "Plan-Structured Deep Neural Network Models for Query Performance Prediction", 2019, https://www.vldb.org/pvldb/vol12/p1733-marcus.pdf (Year: 2019).

Tao et al. "Query-level loss functions for information retrieval", Mar. 2008, https://www.sciencedirect.com/science/article/pii/S0306457307001276 (Year: 2008).

Sun et al. "Learned Cardinality Estimation for Similarity Qeries", Jun. 25, 2021, https://dl.acm.org/doi/pdf/10.1145/3448016.3452790 (Year: 2021).

Yang et al. "Deep Unsupervised Cardinality Estimation", 2019, htttps://vldb.org/pvldb/vol13/p279-yang.pdf (Year: 2019).

Zheng et al. "Learned Probing Cardinality Estimation for High-Dimensional Approximate NN Search", 2023, https://ieeexplore.ieee.org/stamp/stamp.jsp?arnumber=10184837&tag=1 (Year: 2023).

United States Patent and Trademark Office, Office Action issued in related U.S. Appl. No. 17/931,671 dated Aug. 9, 2024.

United States Patent and Trademark Office, Office Action issued in related U.S. Appl. No. 18/054,323 dated Sep. 10, 2024.

* cited by examiner

APPARATUS, METHOD AND STORAGE MEDIUM FOR DATABASE QUERY

TECHNICAL FIELD

The present disclosure relates to the field of computers, and more particularly, to an apparatus, method, and storage medium for database query.

BACKGROUND

In a data query for a database, query parameters may be used to determine the number of corresponding query indexes, in order to control query granularity and query accuracy. In the prior art, for example, a data query applied to a vector database uses the same query parameters for all query vectors. However, the query range required for query results found in the index by different query vectors is different. It could be understood that a simple query requires less data to be queried and results can be found quickly; and complex queries require a large range of data to be queried. Therefore, in the prior art, setting the same query parameters for all query vectors causes a large number of redundant queries, resulting in poor query performance.

SUMMARY

The following examples pertain to embodiments described throughout this disclosure.

One or more embodiments can include an apparatus. The apparatus includes a memory for storing database data and a processor. The processor is configured to perform following processes, including: acquiring a query request from a user: determining query parameters which are corresponding to each of multiple shards based on the query request using a preset neural network model, wherein the query parameters control query complexity by affecting a query range of database data of the query request for the corresponding shard: and querying database data in each shard based on the query request and the query parameters to obtain a target query result.

In some embodiments, the database data is stored under different shards so that query calculations of the database may be distributed into shards, and then query calculations may be performed on multiple shards at the same time so that query calculations of the database become efficient. Moreover, at least part of the shards in multiple shards is determined by clustering the database data in a preset manner.

In some embodiments, the database is a vector database, and the query request of the user includes a query vector. Since the query parameter can determine the range of data to which the query relates, setting different query parameters for different shards can effectively avoid redundant queries, thereby effectively avoiding redundant queries. Therefore, a query parameter corresponding to a vector cached in each shard can be calculated based on the query vector. For example, a larger query parameter can be determined for a larger number of predicted query results in a shard, a smaller query parameter can be determined for a smaller number of predicted query results in a shard, and a query parameter of a corresponding value is adaptively set for each shard, thereby reducing redundant queries and improving database performance.

One or more embodiments can include an apparatus, wherein the database data comprises first data, the preset neural network model comprises a parameter prediction model, the query result comprises a first query result, the query parameter comprises a first query parameter, and further determining query parameters which are corresponding to each of multiple shards based on the query request using a preset neural network model, comprising: performing query result prediction on first data in each shard based on the query request using the parameter prediction model to obtain a first predicted number of first query results in each shard, wherein the first data is used to indicate inventory data which is clustered and be stored in shards: acquiring a preset correspondence between the predicted number and the query parameter: and determining a first query parameter corresponding to each shard according to the preset correspondence and the first predicted number.

It could be understood that the first data is used to indicate inventory data of cluster shards, which is database data that is clustered in a specified manner and then put into each shard. In some embodiments provided herein, the inventory data is vector data that is clustered in a specified manner and then put into each shard. For example, the vector data is clustered in a K-means and then put into each shard so that the vector data in each shard is similar. The parameter prediction model may be a logical regression model or a lightweight neural network model, and a query request may be input to the parameter prediction model to predict the number of predicted query results included in each shard. Since the number of query results and the number of query parameters are positively correlated, a larger query parameter may be set for a shard with a larger number of query results, and a smaller query parameter may be set for a shard with a smaller number of query results, so as to reduce redundant queries and improve database performance.

One or more embodiments can include an apparatus, wherein determining a first query parameter corresponding to each shard according to the preset correspondence and the first predicted number comprises: generating a preset mapping table based on the preset correspondence between the predicted number and the query parameter, and determining a first query parameter corresponding to each shard according to the first predicted number and the preset mapping table.

It could be understood that the first query parameter may be calculated based on the positive correlation between the number of prediction results and the query parameter. For example, a preset mapping table may be constructed in which the number of predictions corresponds to the value of the first query parameter, so that the corresponding first query parameter is determined directly in the preset mapping table using the number of predictions.

One or more embodiments can include an apparatus, wherein determining a first query parameter corresponding to each shard according to the preset correspondence and the first predicted number comprises: determining a weighting coefficient based on the preset correspondence between the predicted number and the query parameter, and calculating the first predicted number based on the weighting coefficient to determine a first query parameter corresponding to each shard.

For example, a weighted value may be obtained based on a positive correlation between the number of prediction results and the query parameter, and a corresponding first query parameter may be obtained by performing weighted calculation on the number of predictions using the weighted value.

One or more embodiments can include an apparatus, wherein the database data includes second data indicating incremental data which is not clustered and be stored in the respective shards in chronological order.

It could be understood that the incremental data is stored in chronological order in multiple shards of the database, and when the incremental data is stored in large quantities and has not been clustered at all times, the database will increase the shards to store all the incremental data.

One or more embodiments can include an apparatus, wherein determining a first query parameter corresponding to each shard according to the preset correspondence and the first predicted number further comprises: storing the first query parameter as a history query parameter: determining the second data in a preset time period, and storing the second data into shards after clustering to obtain updated first data in each shard: and using the preset neural network model to reconfirm the first query parameter based on the updated first data and the query request.

It can be understood that the inventory data can be obtained after the increment data are periodically clustered. Therefore, the updated inventory data in each shard can be obtained after the increment data are periodically clustered into the inventory data. In this case, the first query parameter corresponding to each shard may be updated by using the preset neural network model in combination with the query request.

One or more embodiments can include an apparatus, wherein the preset neural network model comprises a sequence learning model, the query result comprises a second query result, the query parameter comprises a second query parameter, and further determining query parameters which are corresponding to each of multiple shards based on the query request using a preset neural network model comprises: determining the number of new shards that the second data stored in is greater than a preset threshold value, and using the sequence learning model to determine the second query parameter of each new shard based on the query request and the historical query parameter.

It could be understood that when the number of shards of incremental data is greater than a preset threshold, the sequence learning model may be trained based on historical query parameters, and the historical query parameters may be input to the sequence learning model to obtain a second query parameter for each new shard.

One or more embodiments can include an apparatus, wherein the preset neural network model comprises a sequence learning model, the query result comprises a second query result, the query parameter comprises a second query parameter, and further determining query parameters which are corresponding to each of multiple shards based on the query request using a preset neural network model comprises: determining the number of new shards that the second data stored in is less than or equal to a preset threshold value, using the historical query parameter to train the parameter prediction model, and using the trained parameter prediction model to determine the second query parameter of each new shard based on the query request.

It could be understood that when the number of shards of the incremental data is less than or equal to a preset threshold, training data for the sequence learning model is lacking. In this case the parameter prediction model may be trained by using the inventory data, and a corresponding second query parameter may be determined by using a new shard generated when the number of shards of the parameter prediction model for the incremental data is small.

One or more embodiments can include an apparatus, wherein using the trained parameter prediction model to determine the second query parameter of each new shard based on the query request comprises: performing query result prediction on the second data in each new shard based on the query request using the trained parameter prediction model to obtain a second predicted number of the second query result in each new shard: acquiring a preset correspondence between the predicted number and the query parameter, and determining the second query parameter which is corresponding to each new shard according to the second predicted number and the preset correspondence.

It could be understood that the parameter prediction model may be a logical regression model or a lightweight neural network model, and the query request may be input to the parameter prediction model trained by historical query parameters to predict the second number of predictions of the second query results contained in each new shard. Since the number of query results and the value of the query parameters are positively correlated, a larger second query parameter may be set for new shards with a larger number of second query results, and a smaller second query parameter may be set for shards with a smaller number of second query results, so as to reduce redundant queries and improve database performance.

One or more embodiments can include an apparatus, wherein query database data in each shard based on the query request and the query parameters to obtain a target query result comprises: querying first data in each shard based on the query request and the first query parameter to obtain a first query result: querying second data in each new shard based on the query request and the second query parameter to obtain a second query result: and aggregating the first query result and the second query result to obtain a target query result.

It could be understood that each shard is queried based on a query request and query parameters corresponding to each shard, and a first query result and a second query result are obtained. Since the first query result and the second query result are respectively queried result sets, and the first query result and the second query result are out of order, the aggregation processing may be performed on the basis of the query request to reorder the first query result and the second query result according to the query request to obtain an ordered target query result, and a quantity of query results arranged in the first order may be selected as the target query result based on the query request. For example, when only the first 10 results need to be arranged in the query request, the result of the first 10 results in the reordered result set may be arranged as the target query result and returned to the user.

One or more embodiments can include an apparatus, further comprising: determining at least one query shard according to the first predicted number.

It could be understood that the shards described above may be used to cache data in a database where the shards may be cached by a user, where each shard is separated in a software level sense. Therefore, the shard query can also be implemented based on the shard of the database, which avoids redundant calculation in the query process. For example, the data in each shard can be similar after aggregation of the inventory data. In this case, if the shard with high similarity to the query request can be determined, the data can be queried only in the shard with high similarity, which avoids redundant query calculation and saves system resources.

One or more embodiments can include an apparatus, wherein query database data in each shard based on the query request and the query parameters to obtain a target query result comprises: querying database data in each of the at least one query shard based on the query request and query parameters to obtain a target query result.

It could be understood that the target query results can be obtained only by querying the data in a partially designated shard, thereby avoiding redundant query calculations and saving system resources.

One or more embodiments can include a method performed by at least one processor. The method includes acquiring a query request from a user: determining query parameters which are corresponding to each of multiple shards based on the query request using a preset neural network model, wherein the query parameters control query complexity by affecting a query range of database data of the query request for the corresponding shard: and querying database data in each shard based on the query request and the query parameters to obtain a target query result.

One or more embodiments can include a computer-readable storage medium having stored thereon instructions that, when executed on an electronic device, cause the electronic device to perform a method. The method includes acquiring a query request from a user: determining query parameters which are corresponding to each of multiple shards based on the query request using a preset neural network model, wherein the query parameters control query complexity by affecting a query range of database data of the query request for the corresponding shard: and querying database data in each shard based on the query request and the query parameters to obtain a target query result.

One or more embodiments can include a computer-readable storage medium having stored thereon instructions that, wherein the database data comprises first data, the preset neural network model comprises a parameter prediction model, the query result comprises a first query result, the query parameter comprises a first query parameter, and further determining query parameters which are corresponding to each of multiple shards based on the query request using a preset neural network model, comprising: performing query result prediction on first data in each shard based on the query request using the parameter prediction model to obtain a first predicted number of first query results in each shard, wherein the first data is used to indicate inventory data which is clustered and be stored in shards: acquiring a preset correspondence between the predicted number and the query parameter: and determining a first query parameter corresponding to each shard according to the preset correspondence and the first predicted number.

One or more embodiments can include a computer-readable storage medium having stored thereon instructions that, wherein determining a first query parameter corresponding to each shard according to the preset correspondence and the first predicted number comprises any one of: generating a preset mapping table based on the preset correspondence between the predicted number and the query parameter, and determining a first query parameter corresponding to each shard according to the first predicted number and the preset mapping table: or determining a weighting coefficient based on the preset correspondence between the predicted number and the query parameter, and calculating the first predicted number based on the weighting coefficient to determine a first query parameter corresponding to each shard.

One or more embodiments can include a computer-readable storage medium having stored thereon instructions that, wherein the database data includes second data indicating incremental data which is not clustered and be stored in the respective shards in chronological order, and determining a first query parameter corresponding to each shard according to the preset correspondence and the first predicted number further comprises: storing the first query parameter as a history query parameter: determining the second data in a preset time period, and storing the second data into shards after clustering to obtain updated first data in each shard: and using the preset neural network model to reconfirm the first query parameter based on the updated first data and the query request.

One or more embodiments can include a computer-readable storage medium having stored thereon instructions that, wherein the preset neural network model comprises a sequence learning model, the query result comprises a second query result, the query parameter comprises a second query parameter, and further determine query parameters which are corresponding to each of multiple shards based on the query request using a preset neural network model comprises any one of: determining the number of new shards that the second data stored in is greater than a preset threshold value, and using the sequence learning model to determine the second query parameter of each new shard based on the query request and the historical query parameter: or determining the number of new shards that the second data stored in is less than or equal to a preset threshold value, using the historical query parameter to train the parameter prediction model, and using the trained parameter prediction model to determine the second query parameter of each new shard based on the query request.

One or more embodiments can include a computer-readable storage medium having stored thereon instructions that, wherein using the trained parameter prediction model to determine the second query parameter of each new shard based on the query request comprises: performing query result prediction on the second data in each new shard based on the query request using the trained parameter prediction model to obtain a second predicted number of the second query result in each new shard: acquiring a preset correspondence between the predicted number and the query parameter, and determining the second query parameter which is corresponding to each new shard according to the second predicted number and the preset correspondence.

One or more embodiments can include a computer-readable storage medium having stored thereon instructions that, wherein query database data in each shard based on the query request and the query parameters to obtain a target query result comprises: querying first data in each shard based on the query request and the first query parameter to obtain a first query result; querying second data in each new shard based on the query request and the second query parameter to obtain a second query result: and aggregating the first query result and the second query result to obtain a target query result.

One or more embodiments can include a database query system. The system includes an access module, a coordinator module, and a query module. The access module is configured to obtain a query request of a user. The coordinator module is configured to determine a query parameter corresponding to each of multiple shards based on the query request by using a preset neural network model, wherein the query parameter controls query complexity by influencing a query range of the query request for database data of the corresponding shard, and at least some of multiple shards are determined by clustering the database data by using a preset method: the query module is configured to query database data in each shard based on the query request and the query parameter to obtain a target query result.

BRIEF DESCRIPTION OF THE FIGURES

The foregoing summary, as well as the following detailed description of the exemplary embodiments, will be better understood when read in conjunction with the appended drawings. For the purpose of illustrating the present disclosure, there are shown in the drawings embodiments, which are presently preferred. It will be understood, however, that the present disclosure is not limited to the precise arrangements and instrumentalities shown.

In the drawings.

DETAILED DESCRIPTION

Figure 1:
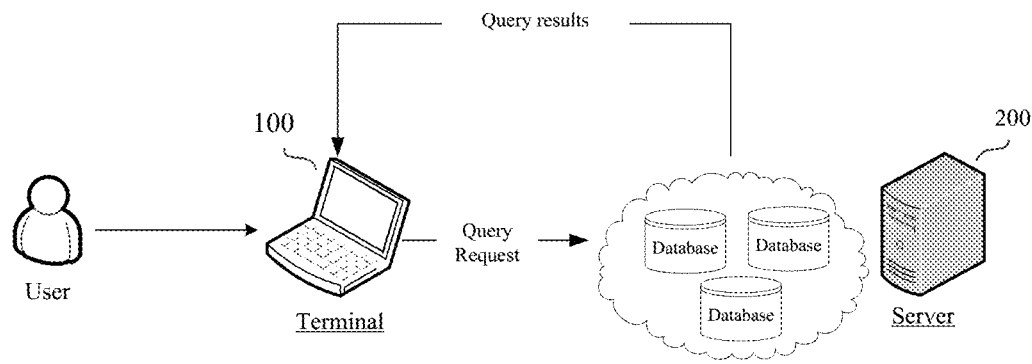
FIG. 1 illustrates a schematic diagram of a disclosure scenario for a database search in accordance with some embodiments provided herein.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body: The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a." as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that cannot be present in all exemplary embodiments of the subject disclosure.

In order that the objects, technical solutions, and advantages of the embodiments of the present disclosure may be made clearer, the technical solutions in the embodiments of the present disclosure will be described in detail below in connection with the accompanying drawings and specific embodiments.

Illustrative embodiments of the present disclosure include, but are not limited to, an apparatus, method, and storage medium for database paging queries.

To facilitate a person skilled in the art in understanding the schemes in the embodiments of the present disclosure, some of the concepts and terms referred to in the embodiments of the present disclosure are explained below.

(1) Vector Database

A database that can be used to store, retrieve, and analyze vectors can be used to provide services for retrieving pictures using pictures, such as face retrieval, human retrieval, vehicle retrieval and so on.

(2) Vector

Vectors may be encoded from information in unstructured data, such as feature vectors extracted from a picture, and may be used to characterize properties such as color, shape, outline size, and display position of the picture.

(3) Query Parameter

The query parameter is an influence parameter when the vector database is retrieved. Generally, when a query operation is performed, a query parameter is a value. For a database to which an index has been established, the query parameter may be used to determine a data range involved in the query, thereby affecting query accuracy and query performance of the database. Because the larger the query parameter, the higher the query precision, and the worse the query performance of the database, we need to do trade off.

(4) Shard

Shard is one type of database partitioning that divides a large database into smaller, faster, more manageable portions called data shard.

(5) Recall Rate (Recall)

The recall rate is the proportion of all positive cases correctly predicted for evaluating the detection coverage of all targets to be detected by the detector, indicating how much of the positive cases in the sample have been predicted correctly, that is, for indicating whether the correct detection result is found to be complete.

FIG. 1 illustrates a schematic diagram of a disclosure scenario for a database search in accordance with some embodiments provided herein. It could be understood that the user may be an administrative user of the terminal 100, the terminal 100 may be connected to a server 200, the server 200 may be a cloud server, the server 200 may provide a database storage environment, and may provide multiple shards for querying a database. In some embodiments, the database data is stored under different shards so that query calculations of the database may be distributed into shards, and then query calculations may be performed on multiple shards at the same time so that query calculations of the database become efficient. The terminal 100 acquires a query request from the user, sends the query request to the server 200, and the server 200 queries the data in the database based on the query request to obtain a query result. Next, the server 200 returns the query result to the terminal 100 so that the user can query the query request corresponding data information through the server 200.

Figure 2:
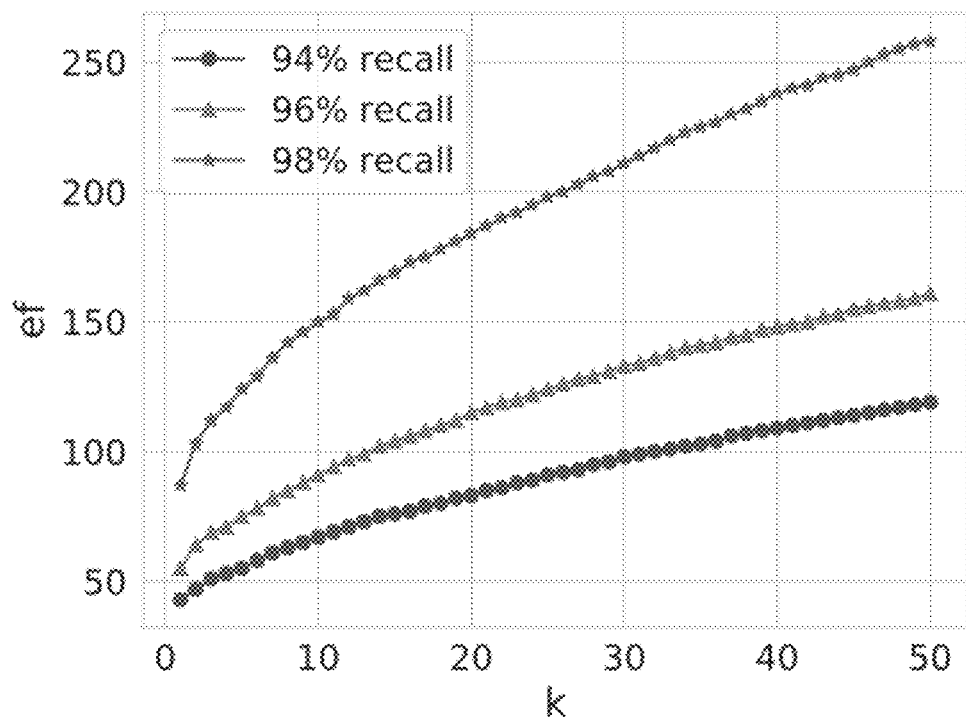
FIG. 2 illustrates a schematic diagram of association of the number of results of a vector query with query parameters in accordance with some embodiments provided herein.

It could be understood that server 200 may also provide a coordinator node that may be used to give query parameters. FIG. 2 illustrates a schematic diagram of association of the number of results of a vector query with query parameters according to some embodiments provided herein, where k is the number of query results and ef is the query parameter. Referring to FIG. 2, since the exact query of the vector search is complex, an approximate query is generally performed for the vector query. When the recall rate of the query result is determined to be at a certain value, for example, the recall rate is set to 94%, 96%, or 98%, respectively, and the number of query results k and the value of the query parameter ef to be set are positively correlated with respect to the graph index.

However, in some embodiments, for all query requests, the server 200 provides a fixed query parameter for the query, and since the query parameter may determine the range of data to which the query relates, the query range corresponding to the fixed query parameter is also fixed. The fixed query parameters will result in query of database data of the same range, whether simple query requests or complex query requests, generating a large number of redundant queries, wasting system resources, and reducing query performance of the database.

In order to solve the problem that a large number of redundant queries are generated using a single query parameter so as to cause poor query performance of a database, the present disclosure provides a database query method which can be applied to a vector database, and the value of the query parameter is adjusted by dividing data in the database into incremental data and inventory data, thereby avoiding redundant queries. According to a first aspect, the inventory data are placed in different database shards by means of clustering, then a query request of a user is acquired, the number of results included in each database shard is predicted based on the query request by using a parameter prediction model to obtain a prediction result, query parameters of each database shard are determined based on a preset correspondence between the prediction result and the query parameters, and query processing of the inventory data is completed to obtain a first query result. In the second aspect, the incremental data are sequentially put into different database shards according to the writing time, and then the query parameters of the new shards are determined according to the historical query parameter sequence by using the sequence learning model, and the query processing of the incremental data is completed to obtain the second query result. The first query result and the second query result are aggregated to obtain a target query result, and corresponding query parameters are adjusted for each shard, thereby effectively avoiding redundant queries.

Figure 3A:
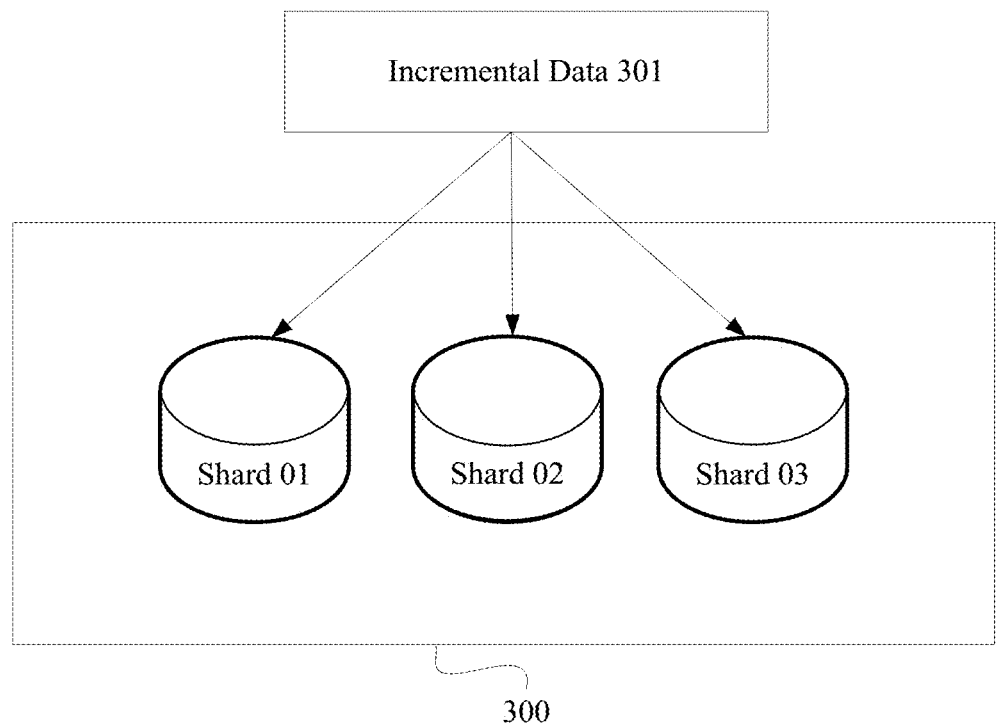
FIG. 3a illustrates a schematic diagram of a manner of obtaining incremental data in accordance with some embodiments provided herein.

For ease of understanding. FIG. 3a illustrates a schematic diagram of a manner of acquiring incremental data in accordance with some embodiments provided herein. Here, the database 300 can be a distributed database having a shard 01, a shard 02, and a shard 03, each of which stores inventory data. In some embodiments of the present disclosure, the inventory data within all shards may be clustered such that the inventory data within a single shard is similar.

It could be understood that the afore mentioned shards 01, 02 and 03 contained in the database 300 are merely examples, and the database 300 may contain more or less shards, which are not limited herein.

Figure 3B:
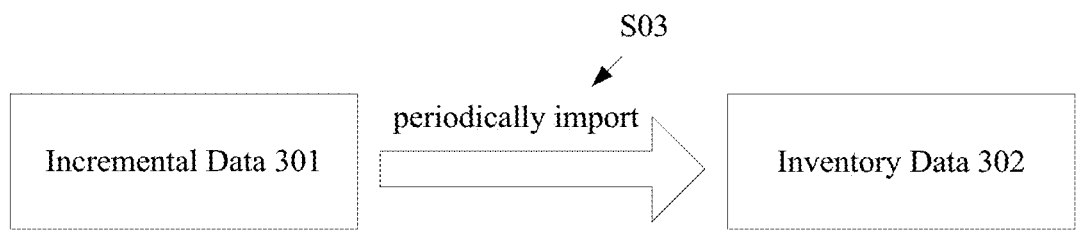
FIG. 3b illustrates a schematic diagram of a manner of introducing incremental data in accordance with some embodiments provided herein.

FIG. 3b illustrates a schematic diagram of a manner of importing incremental data according to some embodiments provided herein. Referring to FIG. 3b, the incremental data 301 may be periodically imported by step S03 to become the inventory data 302. While in a single period, referring to FIG. 3a, the increment data 301 may be stored in chronological order into the slicing 01, the slicing 02, and the slicing 03. When a time condition corresponding to a single period is satisfied, the data in all the shards including the inventory data and the increment data may be subjected to a clustering process, so that the data in the single shard are similar.

Figure 3C:
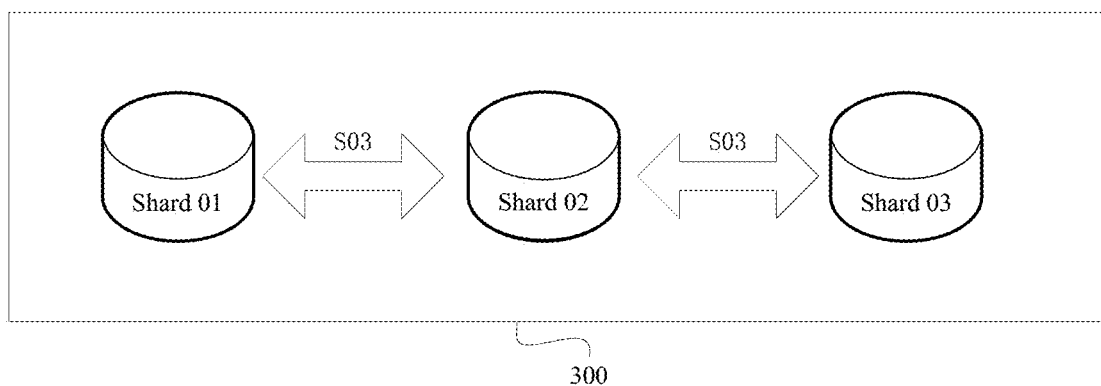
FIG. 3c illustrates a logical schematic diagram of conversion of incremental data to inventory data in other embodiments provided herein.

FIG. 3c illustrates a logical diagram of the conversion of incremental data to inventory data in other embodiments provided herein. It could be understood that the inventory data in each shard may be marked to facilitate identification of incremental data in each shard. Further, when a time condition corresponding to a single period is satisfied, only the increment data in the database 300 is clustered so that the increment data is written into different shards after clustering, the increment data at this time becomes inventory data, and the data in each shard is similar. Referring to FIG. 3c, in order to perform S03 on all the incremental data in the data 300, the incremental data is clustered and the inventory data is updated. By converting the incremental data into the inventory data provided in this embodiment, the calculation amount of the database clustering can be effectively reduced, thereby saving system resources.

Figure 4:
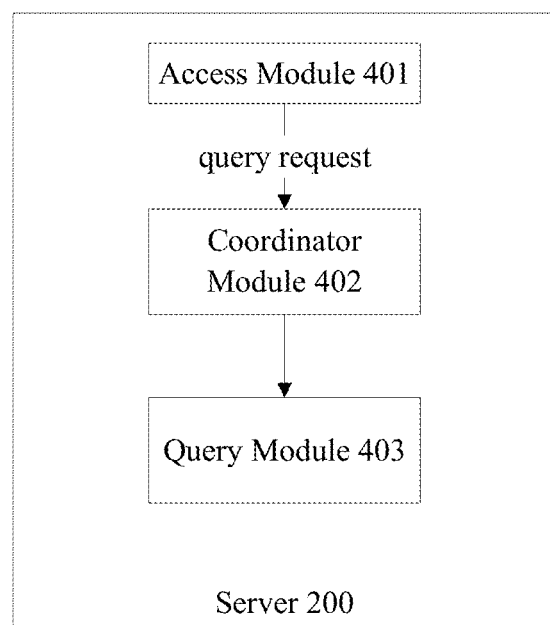
FIG. 4 illustrates a schematic diagram of system architecture of a server 200 in accordance with some embodiments provided herein.

To solve the above problems. FIG. 4 illustrates a schematic diagram of a system framework of a server 200 according to some embodiments provided in the present disclosure. The server 200 may be a cloud server on which an access module 401, a coordinator module 402, and a query module 403 are provided.

The access module 401 may include an SDK access port for obtaining a query request sent by a user and sending the query request to the coordinator module 402.

The coordinator module 402 may determine a corresponding query parameter based on the query request sent by the user, for example, perform corresponding calculation on the inventory data and the incremental data based on the query request of the user respectively to obtain a first query parameter corresponding to the inventory data and a second query parameter corresponding to the incremental data, and send the first query parameter and the second query parameter to the query module 403, so that the query module 403 may complete query processing corresponding to the user query request according to the first query parameter and the second query parameter.

In some embodiments, the query module 403 obtains query requests and query parameters, and queries corresponding data based on the query parameters. For example, the query module 403 queries the inventory data in the corresponding shard according to the first query parameter corresponding to the inventory data to obtain the first query result.

It could be understood that the above shards may be used to cache data in a database, and in some embodiments of the present disclosure, shards in a vector database may be cached by a user. It should be noted that each shard is separate at the software level. Therefore, the shard query can also be implemented based on the shard of the database, which avoids redundant calculation in the query process. For example, the data in each shard can be similar after aggregation of the inventory data. In this case, if the shard with high similarity to the query request can be determined, the data can be queried only in the shard with high similarity, which avoids redundant query calculation and saves system resources.

Figure 5:
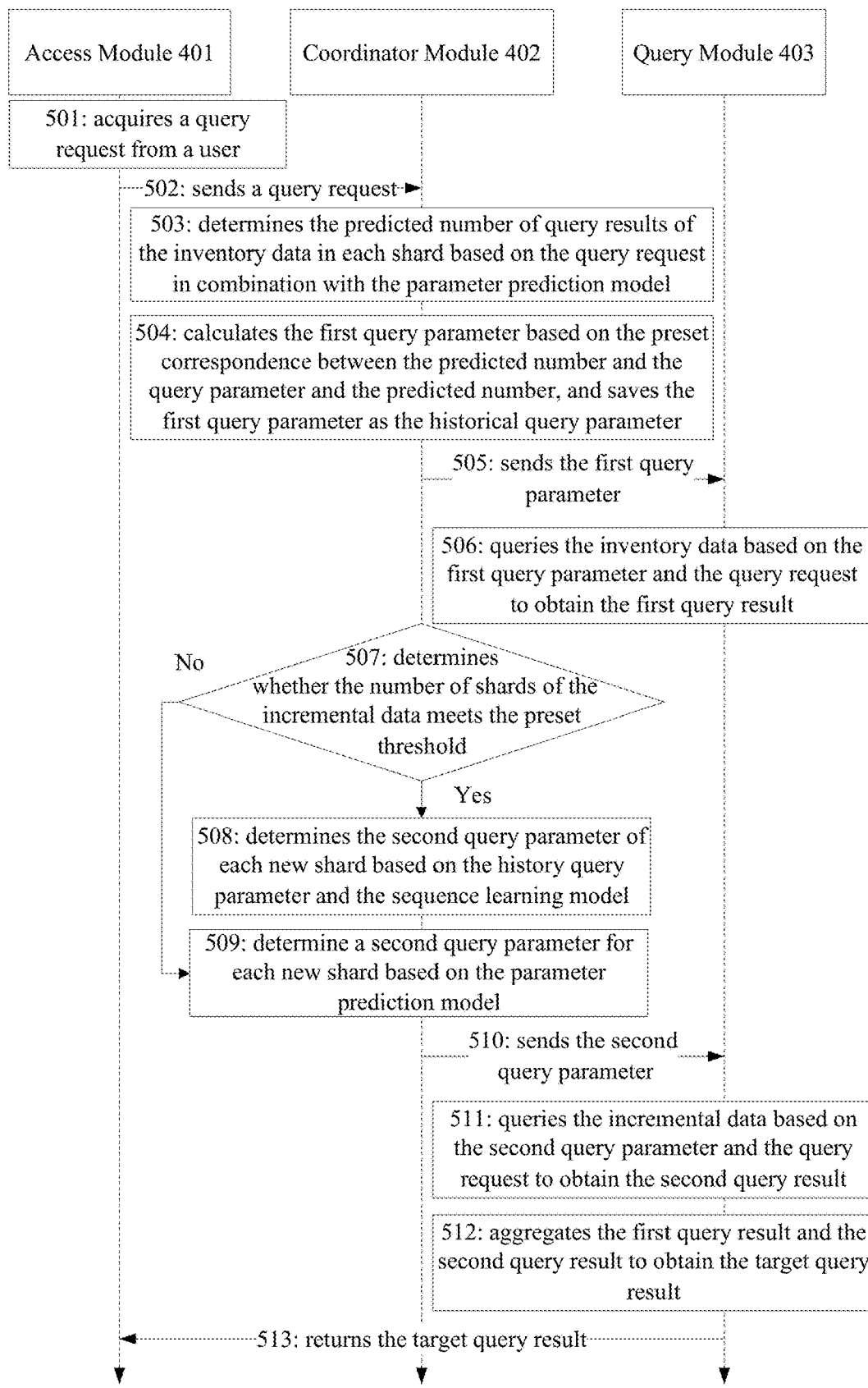
FIG. 5 illustrates a method flow diagram of a database query in accordance with some embodiments provided herein.

Based on the system framework structure of a server 200 illustrated in FIG. 4. FIG. 5 illustrates a method flow diagram of a database query in accordance with some embodiments provided herein. The process flow comprises:

In 501, the access module 401 acquires a query request from a user.

It could be understood that the query request described above may include a query vector for searching a vector database for similar pictures.

The database provided in some embodiments of the present disclosure is a vector database in which a shard of store surveillance video is stored. The surveillance video is initially stored as an image within the vector database in chronological order and in units of one frame. When a user uses a vector database to perform a graph search, the user may give an image to be retrieved as a query request in the retrieval request, and the feature vector corresponding to the image to be retrieved is the query vector. A feature vector of a similar picture can be searched in a vector database by a query vector to determine the similar picture. For example, the similarity between the query vector and the vector stored in the vector database may be calculated to acquire a query result. That is, a similarity vector with high similarity may be selected based on the number of results defined in the query request, and a similar picture corresponding to the selected similarity vector is returned to the user as a query result.

It could be understood that the above-mentioned access module 401 may acquire a query request of a user through a page in which the user can learn information and input information, which is not limited herein.

In 502, the access module 401 sends a query request to the coordinator module 402.

It could be understood that the access module 401 sends a query request of a user to the coordinator module 402 so that the coordinator module 402 can determine corresponding query parameters based on the query request of the user to enable a query to be completed with different query parameters for different data, thereby reducing redundant queries and improving database performance.

In some embodiments, the database is a vector database, a query vector is included in a query request of a user, and a coordinator module 402 may calculate query parameters corresponding to a vector cached in each shard based on the query vector, for example, a larger query parameter may be determined for a larger number of predicted query results in a shard, a smaller query parameter may be determined for a smaller number of predicted query results in a shard, and query parameters of corresponding values are adaptively set for each shard, thereby reducing redundant queries and improving database performance.

In 503, the coordinator module 402 determines the predicted number of query results of the inventory data in each shard based on the query request in combination with the parameter prediction model.

It could be understood that the inventory data is database data that is clustered in a specified manner and then put into each shard. In some embodiments of the present disclosure, the inventory data is vector data that is clustered in a specified manner and then put into each shard. For example, the vector data is clustered in a K-means and then put into each shard so that the vector data in each shard is similar.

In some embodiments of the present disclosure, a shard of store surveillance video is stored in a vector database that includes a shard 1, a shard 2, and a shard 3. The monitored image data in the three shards are initially stored as images in chronological order and in one frame. After clustering each frame of images in a specified manner, the images in each shard can be made to be similar, and multiple shards can be obtained, for example, a shard 1 is an image containing a human image, a shard 2 is an image containing an animal, and a shard 3 is an image not containing a human image and an animal. By clustering, the search can be simplified. For example, when the image given in the user's search request is a feature vector corresponding to the portrait image, the shard 1 obtained after clustering can be directly searched without searching the shard 2 and the shard 3.

In some embodiments of the present disclosure, the parameter prediction model may be a logical regression model or a lightweight neural network model. The coordinator module 402 may input query requests into the parameter prediction model to predict the number of predictions of query results contained in each shard.

Figure 6:
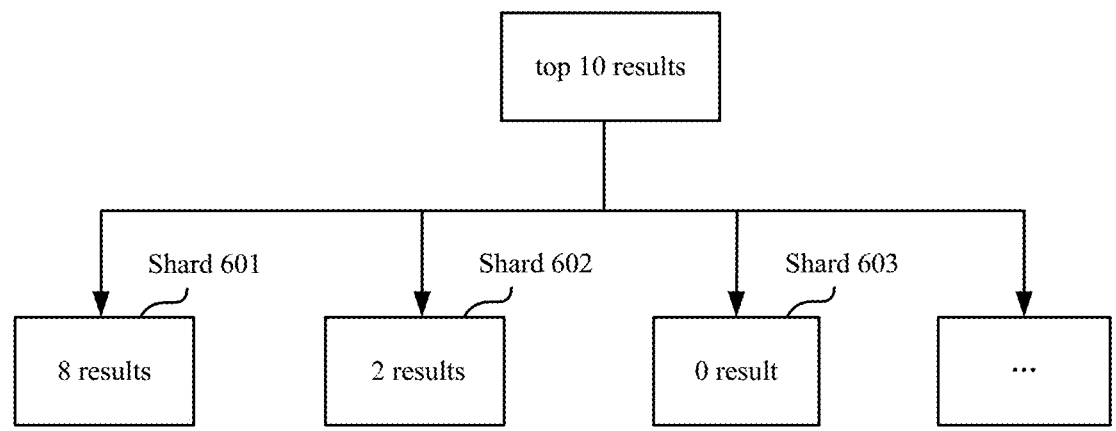
FIG. 6 illustrates a schematic diagram of a prediction query result in accordance with some embodiments provided herein.

FIG. 6 illustrates a schematic diagram of one of the prediction query results in accordance with some embodiments provided herein, for the foregoing embodiments of predicting the number of shard results. Referring to FIG. 6, from the acquired query request sent by the user, it is known that the user needs the first 10 query results. For example, the number of KNN results contained in each shard can be predicted by a lightweight neural network model, the query vector in the user query request is input, and the distribution of the number of KNN results in each shard is output. It could be understood that by inputting the query request of the user into the parameter prediction model, the number of predictions of the first 10 query results in each shard can be predicted. As shown in FIG. 6, the distribution of the parameter prediction model outputs is [0.8, 0.2, 0]. At this time, there are eight results in the shard 601, and two results in the shard 602. None of the remaining shards (e.g., the shard 603) has the first ten query results. Since the number of query results and the number of query parameters are positively correlated, a larger query parameter can be set for the shard 601 and a smaller query parameter can be set for the shard 602 to reduce redundant queries and improve database performance.

In still other embodiments, with continued reference to FIG. 6, only query shards 602 and shards 602 may be selected based on predicted query results, with the remaining shards no longer being queried to conserve system computing resources and further improve database performance.

Figure 7:
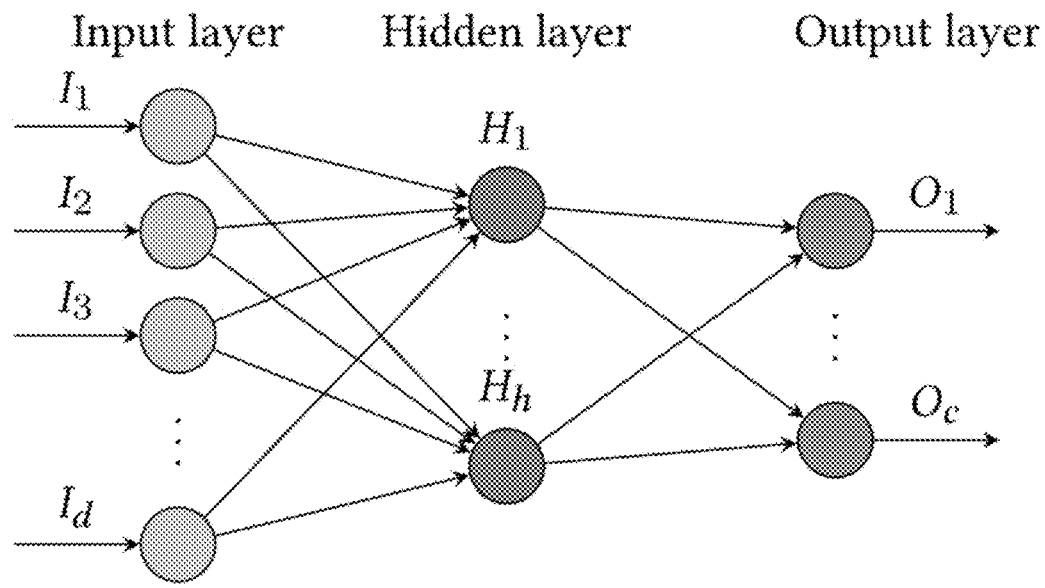
FIG. 7 illustrates a model calculation diagram of a parameter prediction model in accordance with some embodiments provided herein.

Based on the parameter prediction model in some embodiments shown in FIG. 6 above. FIG. 7 illustrates a model calculation diagram of the parameter prediction model in some embodiments provided herein, where I1, I2, I3, . . . ID is a sequence of query vectors included in the input query request, and is input to the parameter prediction model from the input layer, and is output to the output layer after a preset calculation in the model via Hidden layer to obtain a distribution sequence of the number of query results corresponding to each shard, for example, the number distribution of query results in the embodiment of FIG. 6 can be expressed as [0.8, 0.2, and 0].

It could be understood that the preset calculation process in the above model is a calculation process of the parameter prediction model, which is related to the training data of the first neural network and the calculation method of the neural network, and is not limited herein.

In 504, the coordinator module 402 calculates the first query parameter based on the preset correspondence between the predicted number and the query parameter and the predicted number, and saves the first query parameter as the historical query parameter.

For example, if the number of predictions is the number of predictions of the query results of the inventory data in each shard, it is possible to obtain the number of predictions of the query results corresponding to multiple single shards, that is, the distribution of the number of predictions of the query results on each shard. For example, referring to FIG. 6, the number of query result predictions in FIG. 6 is distributed over each shard by [0.8, 0.2, 0]. Then, the first query parameter is calculated based on the positive correlation between the number of prediction results and the query parameter. For example, a preset mapping table may be constructed in one-to-one correspondence between the number of prediction results and the value of the first query parameter, so that the corresponding first query parameter can be determined directly in the preset mapping table by using the number of prediction results. In other embodiments, a weighted value may be obtained based on a positive correlation between the number of prediction results and the query parameter, and a corresponding first query parameter may be obtained by weighted calculation of the number of predictions using the weighted value. Then, the first query parameter is saved as a history query parameter.

It should be noted that the first query parameter is calculated based on the preset correspondence between the number of prediction results and the query parameter and the number of predictions, and the calculation method is not limited herein.

It could be understood that the coordinator module 402 may be provided with a log unit that records all the acquired query requests, the calculated first query parameters, the second query parameters, and the calculation process into logs, and stores the logs in the log unit.

In 505, the coordinator module 402 sends the first query parameter to the query module 403.

It could be understood that the coordinator module 402 sends the first query parameters to the query module 403 so that the query module 403 can accurately query the inventory data on each shard according to the first query parameters, thereby reducing redundant queries and improving database performance.

In 506, the query module 403 queries the inventory data based on the first query parameter and the query request to obtain the first query result.

It could be understood that the query module 403 queries the inventory data cached in at least one shard based on the first query parameter and the query request to obtain the first query result, so as to accurately query the inventory data on each shard, reduce redundant queries, and improve database performance.

It could be understood that the first query parameter may be a sequence of parameters sorted according to the order in which the inventory data is sharded. The query module 403 queries the inventory data cached on each shard based on the first query parameter corresponding to each shard and the query request, and obtains that the query result corresponding to each shard is the first query result.

In 507, the coordinator module 402 determines whether the number of shards of the incremental data meets the preset threshold. If yes, the coordinator module 402 proceeds to step 508 and determines the second query parameter of each new shard based on the history query parameter and the sequence learning model. If not, step 509 proceeds to determine a second query parameter for each new shard based on the parameter prediction model.

It could be understood that the incremental data is stored in chronological order in multiple shards of the database, and when the incremental data is stored in large quantities and has not been clustered at all times, the database will increase the shards to store all the incremental data. Therefore, the coordinator module 402 determines whether the number of shards of the incremental data is greater than the preset threshold value, and when the number of shards of the incremental data is greater than the preset threshold value, trains the sequence learning model based on the historical query parameters, and inputs the historical query parameters into the sequence learning model to obtain the second query parameters of each new shard. When the number of shards of the incremental data is less than or equal to a preset threshold value, training data for the sequence learning model is not available. In this case, the inventory data can be used to train the parameter prediction model, and a new shard generated when the number of shards of the incremental data is small is used to determine a corresponding second query parameter.

In some embodiments, store-monitored video A is stored in a vector database that includes shard 1, shard 2, and shard 3 from 0 to 11.59 hours of the day, and the vector database has a clustering period of 12 hours. The monitored image data A in the above three shards are initially stored as multiple images A in chronological order and in units of one frame. After 12 o'clock of the day, a clustering period of 12 hours in length is satisfied. At this time, the inventory data A is obtained by clustering each frame of the image A in a specified manner, so that the images in each shard are similar, and multiple shards are obtained. For example, the shard 1 is an image including a portrait, the shard 2 is an image including an animal, and the shard 3 is an image not including a portrait and an animal.

According to the above-described embodiment, the clustering period of 12 hours is not satisfied again at 12:01 on the same day. Therefore, the monitoring image data B at 12:01 on the same day is stored as multiple images B in time sequence and in one frame unit, that is, incremental data.

Since the time is too short, the number of frames of the image B is small and stored in the shard 1, and the number of shards stored in the incremental data is 1. However, only the historical query parameters of shard 1 are insufficient to train the sequence learning model, and the second query parameters cannot be obtained. Therefore, the parameter prediction model can be trained by using the inventory data, and the parameter prediction model can be used to determine the corresponding second query parameter for newly added shards generated when the number of incremental data shards is small.

In 508, a second query parameter for each new shard is determined based on the historical query parameter and the sequence learning model.

It could be understood that the historical query parameters may be stored in a log including multiple first query parameters corresponding to each shard in the historical calculation. Thus, the query parameters corresponding to each shard set in history can be obtained by means of some sequence learning, so that the query parameters to which the new shard should be set can be obtained. In some embodiments, the sequence learning model may be a lightweight RNN model, such as a Long Short Term Memory (LSTM). Then, a history query parameter forming parameter sequence is input as input data to a sequence learning model to obtain a second query parameter of each new shard. Therefore, redundancy query is avoided, and database query performance is improved.

In 509, a second query parameter for each new shard is determined based on the parameter prediction model trained by the inventory data.

It could be understood that the second query parameter can be successfully output because the sequence learning model requires a certain amount of data for training. However, because the slicing of the vector database is obtained by periodic clustering, in a short time after a single clustering cycle, the number of the incremental data is too small, so that the number of the slicing of the incremental data is less than or equal to a preset threshold value, and the number of the slicing of the incremental data is difficult to meet the training condition of the sequence learning model. It could be understood that a second query parameter for each new shard may be determined based on the inventory data training parameter prediction model and using the trained parameter prediction model.

It could be understood that the above determination of the second query parameter for each new shard using the trained parameter prediction model may refer to the foregoing steps 503 to 504, and details are not described herein.

In 510, the coordinator module 402 sends the second query parameter to the query module 403.

It could be understood that the coordinator module 402 sends the second query parameter to the query module 403 so that the query module 403 can accurately query the incremental data stored on each new shard according to the second query parameter, thereby reducing redundant queries and improving database performance.

In 511, the query module 403 queries the incremental data based on the second query parameter and the query request to obtain the second query result.

It could be understood that the query module 403 queries the incremental data of the at least one newly added shard cache based on the second query parameter and the query request to obtain a second query result so as to accurately query the incremental data on each newly added shard to reduce redundant queries and improve database performance.

In 512, the query module 403 aggregates the first query result and the second query result to obtain the target query result.

It could be understood that the query module 403 performs aggregation processing on the first query result and the second query result. The aggregation processing may reorder the first query result and the second query result according to the query request to obtain an ordered target query result.

In 513, the query module 403 returns the target query result to the access module 401.

It could be understood that the query module 403 returns the target query result to the access module 401, thereby providing the user with the target query result corresponding to the query request.

It could be understood that the reference numerals for the above steps are used only to identify different steps and not to define the order in which the steps are performed.

It should be noted that the query process for the inventory data characterized in the above steps 503 to 506 and the query process for the incremental data characterized in the above steps 507 to 511 may be performed in parallel. It will be further understood that the query parameter calculation of the inventory data and the query parameter calculation of the incremental data may be performed in parallel by the coordinator module 402, and the query process of the inventory data and the query process of the incremental data may also be performed in parallel by the query module 403.

It can be understood that by the database query method of the above examples in steps 501 to 513, the database data are classified into the clustered inventory data and the incremental data stored in the time sequence by the unclustered shards, so that query parameters corresponding to each shard are respectively set for different types of database data by different neural network models, so as to avoid redundant queries generated in the query process, thereby effectively improving the database performance.

Some embodiments of the present disclosure also provide an electronic device comprising a memory for storing instructions for execution by one or more processors of the electronic device, and a processor that is one of the one or more processors of the electronic device for performing the above-described database query method.

Figure 8:
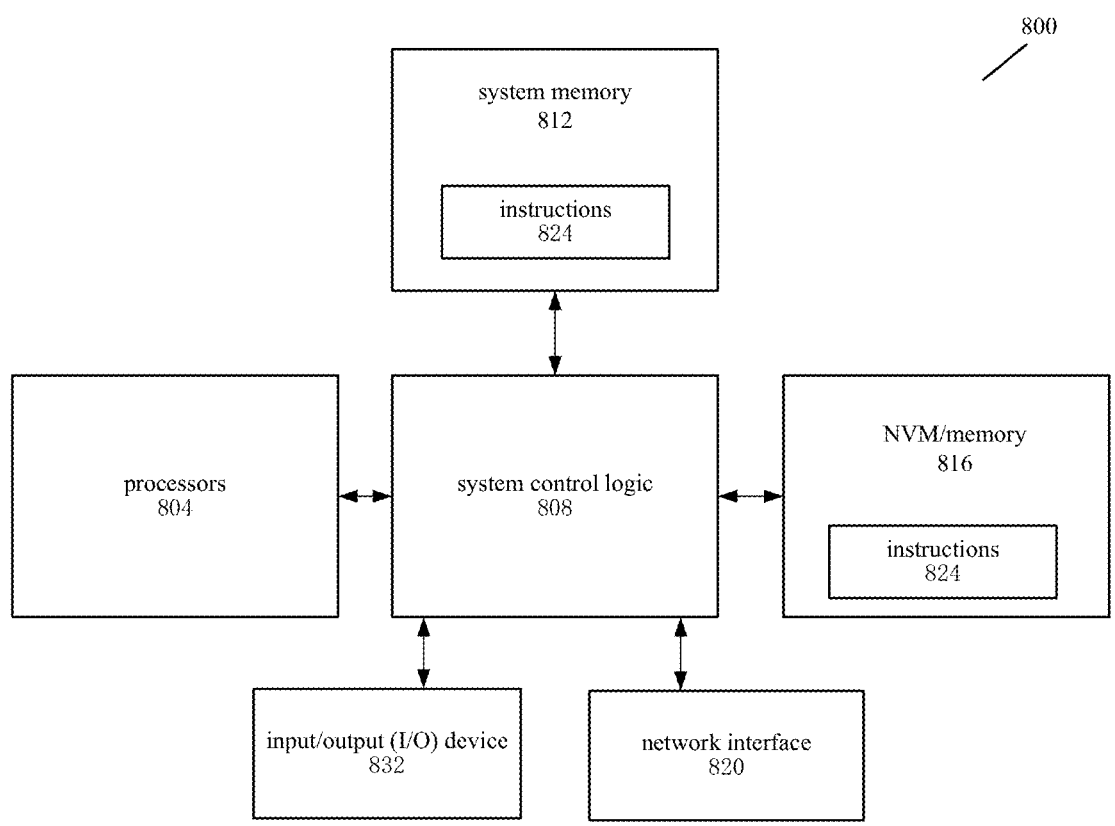
FIG. 8 illustrates a block diagram of one electronic device in accordance with some embodiments provided herein.

FIG. 8 illustrates a block diagram of one electronic device according to embodiments provided herein. The electronic device 800 may include one or more processors 804, system control logic 808 coupled to at least one of processors 804. A system memory 812 can be coupled to system control logic 808. A non-volatile memory (NVM) 816 can be coupled to system control logic 808. A network interface 820 can be coupled to system control logic 808.

In embodiments, the processor 804 can include one or more single-core or multi-core processors. In some embodiments, processor 804 can include any combination of a general purpose processor and a special purpose processor (e.g., a graphics processor, a disclosure processor, a baseband processor, etc.). In embodiments in which the electronic device 800 employs an eNB (Evolved Node B) 101 or an RAN (Radio Access Network) controller 102, the processor 804 can be configured to perform various compliant embodiments.

In embodiments, the system control logic 808 can include any suitable interface controller to provide any suitable interface to at least one of the processors 804 and/or any suitable device or component in communication with the system control logic 808.

In embodiments, the system control logic 808 can include one or more memory controllers to provide an interface to system memory 812. The system memory 812 can be used to load and store data and/or instructions. The memory 812 of the electronic device 800 can include any suitable volatile memory, such as a suitable dynamic random access memory (DRAM), in some embodiments.

The NVM/memory 816 can include one or more tangible, non-transitory computer-readable media for storing data and/or instructions. In some embodiments, the NVM/memory 816 can include any suitable non-volatile memory, such as flash memory, and/or any suitable non-volatile storage device, such as at least one of an HDD (Hard Disk Drive), a CD (Compact Disc) drive, and a DVD (Digital Versatile Disc) drive.

The NVM/memory 816 can include a portion of storage resources on the device on which the electronic device 800 is installed, or it can be accessed by, but not necessarily part of, the device. For example NVM/storage 816 can be accessed over a network via network interface 820.

The system memory 812 and NVM/memory 816 can include temporary and permanent copies of instructions 824, respectively. The instructions 824 can include instructions that, when executed by at least one of the processors 804, cause the electronic device 800 to implement the construction method described above. In embodiments, the instructions 824, hardware, firmware, and/or software components thereof can additionally/alternatively be disposed in system control logic 808, network interface 820, and/or processor 804.

The network interface 820) can include a transceiver for providing a radio interface for electronic device 800 to communicate with any other suitable device (e.g., front-end module, antenna, etc.) over one or more networks. In embodiments, the network interface 820) can be integrated with other components of electronic device 800. For example, the network interface 820) can be integrated with at least one of the system memory 812, the NVM/memory 816, and a firmware device (not shown) having instructions that, when executed by at least one of the processors 804, the electronic device 800 implements the above-described construction method.

The network interface 820 can further include any suitable hardware and/or firmware to provide a multiple-input multiple-output radio interface. For example, network interface 820 can be a network adapter, a wireless network adapter, a telephone modem, and/or a wireless modem.

In one embodiment, at least one of the processors 804 can be packaged together with logic for one or more controllers of the system control logic 808 to form a system SiP. In one embodiment, at least one of the processors 804 can be integrated on the same die as logic for one or more controllers of the system control logic 808 to form a system-on-chip (SoC).

The electronic device 800 can further include an input/output (I/O) device 832. I/O device 832 can include a user interface to enable a user to interact with electronic device 800. The peripheral component interface is designed so that the peripheral component can also interact with the electronic device 800. In embodiments, the electronic device 800 further includes a sensor for determining at least one of environmental conditions and location information associated with the electronic device 800.

In some embodiments, the user interface can include, but is not limited to, a display (e.g., a liquid crystal display, a touch screen display, etc.), a speaker, a microphone, one or more cameras (e.g., still image cameras and/or cameras), a flashlight (e.g., a light emitting diode flash), and a keyboard.

In some embodiments, peripheral component interfaces can include, but are not limited to, non-volatile memory ports, audio jacks, and power interfaces.

In some embodiments, the sensors can include, but are not limited to, gyroscope sensors, accelerometers, proximity sensors, ambient light sensors, and positioning units. The positioning unit can also be part of or interact with the network interface 820 to communicate with components of the positioning network (e.g., a Global Positioning System (GPS) satellite).

The embodiments disclosed herein can be implemented in hardware, software, firmware, or a combination of these implementations. Embodiments of the present disclosure can be implemented as a computer program or program code executing on a programmable system including at least one processor, a storage system (including volatile and non-volatile memory and/or storage elements), at least one input device, and at least one output device.

Program code can be applied to the input instructions to perform the functions described herein and to generate output information. The output information can be applied to one or more output devices in a known manner. For purposes of this disclosure, a processing system includes any system having a processor such as, for example, a digital signal processor (DSP), a microcontroller, a disclosure specific integrated circuit (ASIC), or a microprocessor.

The program code can be implemented in a high-level programming language or an object-oriented programming language to communicate with the processing system. The program code can also be implemented in assembly language or machine language, if desired. Indeed, the mechanisms described herein are not limited in scope to any particular programming language. In either case, the language can be a compilation language or an interpretation language.

In some cases, the disclosed embodiments can be implemented in hardware, firmware, software, or any combination thereof. The disclosed embodiments can also be implemented as instructions carried by or stored on one or more temporary or non-temporary machine-readable (e.g., computer-readable) storage media, which can be read and executed by one or more processors. For example, the instructions can be distributed through a network or through other computer-readable media. Thus, a machine-readable medium can include any mechanism for storing or transmitting information in a form readable by a machine (e.g., a computer), including, but not limited to, a floppy disk, an optical disk, an optical disk, a read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic or optical card, a flash memory, or a tangible machine-readable memory for transmitting information (e.g., a carrier wave, an infrared signal digital signal, etc.) in an electrical, optical, acoustic, or other form of propagated signal using the Internet. Thus, a machine-readable medium includes any type of machine-readable medium suitable for storing or transmitting electronic instructions or information in a form readable by a machine (e.g., a computer).

In the drawings, some structural or methodological features can be shown in a particular arrangement and/or sequence. However, it should be understood that such a particular arrangement and/or ordering cannot be required. Rather, in some embodiments, these features can be arranged in a manner and/or sequence different from that shown in the illustrative drawings. In addition, the inclusion of structural or methodical features in a particular figure is not meant to imply that such features are required in all embodiments, and that such features cannot be included or can be combined with other features in some embodiments.

It should be noted that each unit/module mentioned in each device embodiment of the present disclosure is a logical unit/module. Physically, a logical unit/module can be a physical unit/module, can be a part of a physical unit/module, or can be implemented in a combination of multiple physical units/modules. The physical implementation of these logical units/modules is not most important. The combination of functions implemented by these logical units/modules is the key to solving the technical problem proposed in the present disclosure. Furthermore, in order to highlight the inventive part of the present disclosure, the above-mentioned device embodiments of the present disclosure do not introduce units/modules which are not closely related to solving the technical problems set forth in the present disclosure, which does not indicate that the above-mentioned device embodiments do not have other units/modules.

It is to be noted that in the examples and description of this patent, relational terms such as first and second etc. are used solely to distinguish one entity or operation from another entity or operation, and do not necessarily require or imply any such actual relationship or order between such entities or operations. Moreover, the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without further limitation, an element defined by the statement "comprising one": does not rule out there are additional identical elements in the process, method, article, or apparatus that includes the element.

While the present disclosure has been illustrated and described with reference to certain preferred embodiments thereof, it will be understood by those of ordinary skill in the art that various changes can be made in form and detail without departing from the scope of the present disclosure.

As used in the description herein and throughout the claims that follow. "a". "an", and "the" include plural references unless the context clearly dictates otherwise. Also, as used in the description herein and throughout the claims that follow; the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which can be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that can include: A alone: A and B: A, B and C: A, B, C, and D: and so forth. The bounds of an "and/or" list are defined by the complete set of combinations and permutations for the list.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as disclosed above.

The invention claimed is:

1. An apparatus comprising:
   a memory for storing database data, wherein the database data is stored in vector database, the database data including multiple shards, wherein at least a part of multiple shards is determined by clustering the database data in a preset manner; and
   a processor configured to perform following processes, including:
      acquiring a query request from a user;
      determining query parameters which are corresponding to each of multiple shards based on the query request using a preset neural network model, wherein the query parameters control query complexity by affecting a query range of database data of the query request for the corresponding shard, wherein the query range indicates number of query results of the query request for corresponding shard; and
      querying database data in each shard based on the query request and the query parameters to obtain a target query result;
   wherein the database data comprises first data, the preset neural network model comprises a parameter prediction model, the parameter prediction model is used to conduct a preset calculation on a sequence of query vectors corresponding to the query request via Hidden layer after acquiring the sequence of query vectors from input layer, and then output the number of query results corresponding to each shard, the query result comprises a first query result, the query parameters comprise a first query parameter, and further determining query parameters which are corresponding to each of multiple shards based on the query request using a preset neural network model, comprising:
    performing query result prediction on first data in each shard based on the number of the first query result indicated by the query request using the parameter prediction model to obtain a first predicted number of first query results in each shard, wherein the first data is used to indicate inventory data which is clustered and be stored in shards, and the sum of the first prediction number corresponding to each shard is equal to the number of the first query result;
    acquiring a preset correspondence between the predicted number and the query parameters; and
determining a first query parameter corresponding to each shard according to the preset correspondence and the first predicted number.

2. The apparatus according to claim 1, wherein
determining a first query parameter corresponding to each shard according to the preset correspondence and the first predicted number comprises:
    generating a preset mapping table based on the preset correspondence between the predicted number and the query parameter, and determining a first query parameter corresponding to each shard according to the first predicted number and the preset mapping table.

3. The apparatus according to claim 1, wherein
determining a first query parameter corresponding to each shard according to the preset correspondence and the first predicted number comprises:
    determining a weighting coefficient based on the preset correspondence between the predicted number and the query parameter, and calculating the first predicted number based on the weighting coefficient to determine a first query parameter corresponding to each shard.

4. The apparatus according to any one according to claim 1, wherein
the database data includes second data indicating incremental data which is not clustered and be stored in the respective shards in chronological order.

5. The apparatus according to claim 4, wherein
determining a first query parameter corresponding to each shard according to the preset correspondence and the first predicted number further comprises:
    storing the first query parameter as a history query parameter;
    determining the second data in a preset time period, and storing the second data into shards after clustering to obtain updated first data in each shard; and
    using the preset neural network model to reconfirm the first query parameter based on the updated first data and the query request.

6. The apparatus according to claim 5, wherein
the preset neural network model comprises a sequence learning model, the query result comprises a second query result, the query parameter comprises a second query parameter, and further
determining query parameters which are corresponding to each of multiple shards based on the query request using a preset neural network model comprises:
    determining the number of new shards that the second data stored in is greater than a preset threshold value, and using the sequence learning model to determine the second query parameter of each new shard based on the query request and the historical query parameter.

7. The apparatus according to claim 5, wherein the preset neural network model comprises a sequence learning model, the query result comprises a second query result, the query parameter comprises a second query parameter, and further
determining query parameters which are corresponding to each of multiple shards based on the query request using a preset neural network model comprises:
    determining the number of new shards that the second data stored in is less than or equal to a preset threshold value, using the historical query parameter to train the parameter prediction model, and using the trained parameter prediction model to determine the second query parameter of each new shard based on the query request.

8. The apparatus according to claim 7, wherein
using the trained parameter prediction model to determine the second query parameter of each new shard based on the query request comprises:
    performing query result prediction on the second data in each new shard based on the query request using the trained parameter prediction model to obtain a second predicted number of the second query result in each new shard;
    acquiring a preset correspondence between the predicted number and the query parameter, and determining the second query parameter which is corresponding to each new shard according to the second predicted number and the preset correspondence.

9. The apparatus according to claim 6, wherein
querying database data in each shard based on the query request and the query parameters to obtain a target query result comprises:
    querying first data in each shard based on the query request and the first query parameter to obtain a first query result;
    querying second data in each new shard based on the query request and the second query parameter to obtain a second query result; and
    aggregating the first query result and the second query result to obtain a target query result.

10. The apparatus according to claim 1, further comprising:
    determining at least one query shard according to the first predicted number.

11. The apparatus according to claim 10, wherein
querying database data in each shard based on the query request and the query parameters to obtain a target query result comprises:
    querying database data in each of the at least one query shard based on the query request and query parameters to obtain a target query result.

12. A method performed by at least one processor, comprising:
    acquiring a query request from a user;
    determining query parameters which are corresponding to each of multiple shards based on the query request using a preset neural network model, wherein the query parameters control query complexity by affecting a query range of database data of the query request for the corresponding shard, wherein the query range indicates number of query results of the query request for corresponding shard, wherein the database data is stored in vector database; and querying database data in each shard based on the query request and the query parameters to obtain a target query result;

wherein the database data comprises first data, the preset neural network model comprises a parameter prediction model, the parameter prediction model is used to conduct a preset calculation on a sequence of query vectors corresponding to the query request via Hidden layer after acquiring the sequence of query vectors from input layer, and then output the number of query results corresponding to each shard, the query result comprises a first query result, the query parameters comprise a first query parameter, and further determining query parameters which are corresponding to each of multiple shards based on the query request using a preset neural network model, comprising:

performing query result prediction on first data in each shard based on the number of the first query result indicated by the query request using the parameter prediction model to obtain a first predicted number of first query results in each shard, wherein the first data is used to indicate inventory data which is clustered and be stored in shards, and the sum of the first prediction number corresponding to each shard is equal to the number of the first query result;

acquiring a preset correspondence between the predicted number and the query parameters; and determining a first query parameter corresponding to each shard according to the preset correspondence and the first predicted number.

13. A computer-readable storage medium having stored thereon instructions that, when executed on an electronic device, cause the electronic device to perform a method comprising:

acquiring a query request from a user;

determining query parameters which are corresponding to each of multiple shards based on the query request using a preset neural network model, wherein the query parameters control query complexity by affecting a query range of database data of the query request for the corresponding shard, wherein the query range indicates number of query results of the query request for corresponding shard, wherein the database data is stored in vector database; and querying database data in each shard based on the query request and the query parameters to obtain a target query result;

wherein the database data comprises first data, the preset neural network model comprises a parameter prediction model, the parameter prediction model is used to conduct a preset calculation on a sequence of query vectors corresponding to the query request via Hidden layer after acquiring the sequence of query vectors from input layer, and then output the number of query results corresponding to each shard, the query result comprises a first query result, the query parameter comprise a first query parameter, and further determining query parameters which are corresponding to each of multiple shards based on the query request using a preset neural network model, comprising:

performing query result prediction on first data in each shard based on the number of the first query result indicated by the query request using the parameter prediction model to obtain a first predicted number of first query results in each shard, wherein the first data is used to indicate inventory data which is clustered and be stored in shards, and the sum of the first prediction number corresponding to each shard is equal to the number of the first query result;

acquiring a preset correspondence between the predicted number and the query parameters; and determining a first query parameter corresponding to each shard according to the preset correspondence and the first predicted number.

14. The storage medium according to claim 13, wherein determining a first query parameter corresponding to each shard according to the preset correspondence and the first predicted number comprises any one of:

generating a preset mapping table based on the preset correspondence between the predicted number and the query parameter, and determining a first query parameter corresponding to each shard according to the first predicted number and the preset mapping table: or determining a weighting coefficient based on the preset correspondence between the predicted number and the query parameter, and calculating the first predicted number based on the weighting coefficient to determine a first query parameter corresponding to each shard.

15. The storage medium according to claim 13, wherein the database data includes second data indicating incremental data which is not clustered and be stored in the respective shards in chronological order, and determining a first query parameter corresponding to each shard according to the preset correspondence and the first predicted number further comprises:

storing the first query parameter as a history query parameter;

determining the second data in a preset time period, and storing the second data into shards after clustering to obtain updated first data in each shard; and using the preset neural network model to reconfirm the first query parameter based on the updated first data and the query request.

16. The storage medium according to claim 15, wherein the preset neural network model comprises a sequence learning model, the query result comprises a second query result, the query parameter comprises a second query parameter, and further determining query parameters which are corresponding to each of multiple shards based on the query request using a preset neural network model comprises any one of:

determining the number of new shards that the second data stored in is greater than a preset threshold value, and using the sequence learning model to determine the second query parameter of each new shard based on the query request and the historical query parameter: or determining the number of new shards that the second data stored in is less than or equal to a preset threshold value, using the historical query parameter to train the parameter prediction model, and using the trained parameter prediction model to determine the second query parameter of each new shard based on the query request.

17. The storage medium according to claim 16, wherein using the trained parameter prediction model to determine the second query parameter of each new shard based on the query request comprises:

performing query result prediction on the second data in each new shard based on the query request using the trained parameter prediction model to obtain a
second predicted number of the second query result
in each new shard;

acquiring a preset correspondence between the predicted number and the query parameter, and determining the second query parameter which is corresponding to each new shard according to the second predicted number and the preset correspondence.

18. The storage medium according to claim 16, wherein querying database data in each shard based on the query request and the query parameters to obtain a target query result comprises:

querying first data in each shard based on the query request and the first query parameter to obtain a first query result;

querying second data in each new shard based on the query request and the second query parameter to obtain a second query result; and aggregating the first query result and the second query result to obtain a target query result.

* * * * *